US010367907B2

(12) United States Patent
Lawrence et al.

(10) Patent No.: US 10,367,907 B2
(45) Date of Patent: *Jul. 30, 2019

(54) CONTENT DELIVERY NETWORK ARCHITECTURE WITH EDGE PROXY

(71) Applicant: LEVEL 3 COMMUNICATIONS, LLC, Broomfield, CO (US)

(72) Inventors: Joseph C. Lawrence, Boulder, CO (US); Kevin C. Johns, Erie, CO (US); William R. Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,182

(22) Filed: Dec. 4, 2017

(65) Prior Publication Data

US 2018/0091616 A1 Mar. 29, 2018

Related U.S. Application Data

(63) Continuation of application No. 14/626,425, filed on Feb. 19, 2015, now Pat. No. 9,838,497.
(Continued)

(51) Int. Cl.
*H04L 29/08* (2006.01)
*H04L 29/14* (2006.01)
*H04L 12/24* (2006.01)

(52) U.S. Cl.
CPC ...... *H04L 67/2842* (2013.01); *H04L 67/1014* (2013.01); *H04L 67/2814* (2013.01);
(Continued)

(58) Field of Classification Search
CPC ............. H04L 67/2842; H04L 67/1014; H04L 67/2814; H04L 67/1002; H04L 67/1023;
(Continued)

(56) References Cited

U.S. PATENT DOCUMENTS 6,578,068 B1 6/2003 Bowman-Amuah
6,678,793 B1 1/2004 Doyle
(Continued)

FOREIGN PATENT DOCUMENTS

CN 102640135 A 8/2012
CN 103563335 A 2/2014
(Continued)

OTHER PUBLICATIONS

Extended European Search Report, dated Aug. 4, 2017, Application No. 15751589.1, filed Feb. 19, 2015; 8 pgs.
(Continued)

*Primary Examiner* — Azizul Choudhury

(57) ABSTRACT

Aspects of the present disclosure involve systems, methods, computer program products, and the like, for a content delivery network (CDN) architecture utilizing one or more proxy cache devices between a requesting device and an edge cluster of the CDN. The proxy cache device is a relatively high-speed device compared to various possible devices making up one or more edge clusters. Thus, if the proxy has cached the requested content, it is capable of directly servicing the client content request at a faster rate than providing the content from the edge cluster. Otherwise, the proxy cache may request the content from an edge cluster and store the content for quick retrieval in response to additional requests for the content. In one embodiment, the proxy cache may perform an analysis of the request or a series of requests to determine if the content is cached at the proxy cache device.

7 Claims, 5 Drawing Sheets

Related U.S. Application Data

(60) Provisional application No. 62/110,119, filed on Jan. 30, 2015, provisional application No. 61/941,576, filed on Feb. 19, 2014.

(52) U.S. Cl.
CPC .. *H04L 29/08144* (2013.01); *H04L 29/08279* (2013.01); *H04L 29/08738* (2013.01); *H04L 29/08801* (2013.01); *H04L 41/0668* (2013.01); *H04L 67/1002* (2013.01); *H04L 67/1023* (2013.01); *H04L 67/1034* (2013.01); *H04L 69/40* (2013.01)

(58) Field of Classification Search
CPC ........... H04L 67/1034; H04L 29/08144; H04L 29/08279; H04L 29/08738; H04L 29/08801; H04L 41/0668; H04L 69/40
See application file for complete search history.

(56) References Cited

U.S. PATENT DOCUMENTS

| | | |
|---|---|---|
| 6,691,165 B1 | 2/2004 | Bruck |
| 6,842,906 B1 | 1/2005 | Bowman-Amuah |
| 8,225,057 B1 | 7/2012 | Zheng |
| 8,533,254 B1 | 9/2013 | Whitson, Jr. et al. |
| 8,819,187 B1 | 8/2014 | Hofmann |
| 9,544,226 B1 | 1/2017 | Klausler |
| 2003/0115346 A1 | 6/2003 | McHenry et al. |
| 2003/0191822 A1 | 10/2003 | Leighton et al. |
| 2006/0080546 A1 | 4/2006 | Brannon |
| 2006/0250951 A1 | 11/2006 | Ueda |
| 2007/0234115 A1 | 10/2007 | Saika |
| 2008/0010485 A1 | 1/2008 | Shitomi |
| 2009/0276311 A1 | 11/2009 | Pujet et al. |
| 2010/0036947 A1 | 2/2010 | Krishnamurthy |
| 2010/0036954 A1 | 2/2010 | Sakata |
| 2010/0217869 A1 | 8/2010 | Esteban |
| 2011/0276623 A1 | 11/2011 | Girbal |
| 2012/0096106 A1 | 4/2012 | Blumofe et al. |
| 2012/0166591 A1* | 6/2012 | Eggleston ........... H04L 61/1511 709/218 |
| 2012/0203873 A1 | 8/2012 | Lewin et al. |
| 2012/0226649 A1 | 9/2012 | Kovacs et al. |
| 2012/0275597 A1 | 11/2012 | Knox |
| 2012/0317240 A1 | 12/2012 | Wang |
| 2013/0041972 A1 | 2/2013 | Field et al. |
| 2013/0159472 A1 | 6/2013 | Newton et al. |
| 2013/0208591 A1 | 8/2013 | Larsen |
| 2013/0227051 A1* | 8/2013 | Khakpour ........... H04L 67/2842 709/213 |
| 2013/0246638 A1 | 9/2013 | Kovvali et al. |
| 2014/0047539 A1 | 2/2014 | Holloway et al. |
| 2015/0207660 A1 | 7/2015 | Sundaram |
| 2015/0237155 A1 | 8/2015 | Power et al. |
| 2015/0237159 A1 | 8/2015 | Lawrence et al. |
| 2015/0347248 A1 | 12/2015 | Araujo |

FOREIGN PATENT DOCUMENTS

| | | |
|---|---|---|
| WO | WO-2012144584 | 10/2012 |
| WO | WO-2013047207 | 4/2013 |

OTHER PUBLICATIONS

Extended European Search Report, dated Jul. 27, 2017, Application No. 15751742.6, filed Feb. 19, 2017; 8 pgs.

International Preliminary Report on Patentability, dated Aug. 23, 2016, Int'l Appl. No. PCT/US15/016612, Int'l Filing Date Feb. 19, 2015; 10 pgs.

International Preliminary Report on Patentability, dated Aug. 23, 2016, Int'l Appl. No. PCT/US15/016628, Int'l Filing Date Feb. 19, 2015; 8 pgs.

International Search Report, dated Jun. 5, 2015, Int'l Appl.. No. PCT/US15/16628, Int'l Filing Date Feb. 19, 2015; 3 pgs.

International Search Report, dated May 20, 2015, Int'l Appl. No. PCT/US15/016612, Int'l Filing Dated Feb. 19, 2015; 3 pgs.

Written Opinion of the International Searching Authority, dated Jun. 5, 2015, Int'l Appl.. No. PCT/US15/16628, Int'l Filing Date Feb. 19, 2015; 6 pgs.

Written Opinion of the International Searching Authority, dated May 20, 2015, Int'l Appl. No. PCT/US15/016612, Int'l Filing Dated Feb. 19, 2015; 8 pgs.

European Examination Report, dated Feb. 20, 2019, Application No. 15751742.6, filed Feb. 19, 2015; 5 pgs.

Chinese Examination Report, dated Dec. 5, 2018, Application No. 201580008829.9, filed Feb. 19, 2015; 17 pgs.

Japan Notification of Reasons for Refusal, dated Jan. 7, 2019, Application No. 2016-548708, filed Feb. 19, 2015; 7 pgs.

\* cited by examiner

CONTENT DELIVERY NETWORK ARCHITECTURE WITH EDGE PROXY

CROSS-REFERENCE TO RELATED APPLICATIONS

This application is a continuation of and claims the benefit of priority from U.S. patent application Ser. No. 14/626,425, entitled "CONTENT DELIVERY NETWORK ARCHITECTURE WITH EDGE PROXY," filed Feb. 19, 2015, the entire contents of which are incorporated by reference herein for all purposes. Application Ser. No. 14/626,425 claims priority under 35 U.S.C. § 119(e) from U.S. Provisional Application No. 61/941,576, entitled "CONTENT DELIVERY NETWORK ARCHITECTURE WITH EDGE PROXY," filed Feb. 19, 2014, and to U.S. Provisional Application No. 62/110,119, entitled "PROXY SERVER FAILOVER AND LOAD CLUSTERING," filed Jan. 30, 2015, the entire contents of both are fully incorporated by reference herein for all purposes.

FIELD OF THE DISCLOSURE

Embodiments of the present invention generally relate to systems and methods for implementing a telecommunications network, and more specifically for a content delivery network including an edge proxy cache to cache popular content and slice requests for content among content storage devices

BACKGROUND

Content Delivery Networks (CDN) are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, a CDN allows for the distribution of the content through one or more existing networks without the need to store the content within the existing networks.

Typically, a CDN includes several content servers from which the content can be supplied to a requesting end user. In one example, these content servers may be accessed through a telecommunications network to which the end user is in communication. The network may include any number of components to facilitate the connection of the end user to the requested content, such as routers, Internet Service Provider networks, other intermediate networks, and the like. In general, the content available from the CDN is stored on one or more edge clusters connected to the CDN or other upstream content providers. Requests for content are then transmitted by the CDN to the edge clusters or content providers to provide the content to the requesting customers. However, often the CDN has little control over which upstream content storage device provides the content to an end user in response to the received request for content.

It is with these and other issues in mind that various aspects of the present disclosure were developed.

SUMMARY

One implementation of the present disclosure may take the form of a content delivery network. The content delivery network comprises a router in communication with an access network, the access network configured to transmit a request for a content file from a user device connected to the access network, a proxy cache device in communication with the router and configured to receive the request for the content file from the router, and a plurality of edge servers in communication with the proxy cache device through a local network, each of the plurality of edge servers configured to obtain the content file in response to receiving the request for the content file. In addition, the proxy cache device is further configured to calculate a hash value based at least on the request for the content file, select a first edge server from the plurality of edge servers based at least on the calculated hash value, and transmit the request for the content file to the selected edge server.

Another implementation of the present disclosure may take the form of a method for operating a content delivery network. The method may include the operations of receiving a first request for a content file at a first proxy cache device from a router, the router in communication with an access network configured to transmit the first request for the content file from a user device connected to the access network and calculating a first hash value based at least on the first request for the content file. Further, the operations may include selecting a first edge server from a plurality of edge servers based at least on the calculated first hash value, the plurality of edge servers in communication with the proxy cache device through a local network and configured to obtain the content file in response to receiving the first request for the content file and transmitting the first request for the content file to the selected edge server.

Yet another implementation of the present disclosure may take the form of method for providing a content file through a telecommunications network. The method may include the operations of receiving a first request for a content file at a first proxy cache device from a first end user device of a plurality of end user devices in communication with the telecommunications network, calculating a first hash value based at least on the first request for the content file, selecting a first edge server from a plurality of edge servers based at least on the calculated first hash value, the plurality of edge servers configured to obtain the content file in response to receiving the first request for the content file, and transmitting the first request for the content file to the selected edge server. The method may also include the operations of receiving a second request for the content file at a second proxy cache device from a second end user device of the plurality of end user devices in communication with the telecommunications network, calculating a second hash value based at least on the second request for the content file, selecting the first edge server from the plurality of edge servers based at least on the calculated second hash value, and transmitting the second request for the content file to the selected edge server.

DETAILED DESCRIPTION

Aspects of the present disclosure involve systems, methods, computer program products, and the like, for a content delivery network (CDN) architecture utilizing one or more proxy cache devices and/or proxy servers at an edge of the network and between a requesting device and an edge cluster of the CDN. In one example, the proxy receives a client request for content to be provided by the CDN. The content may range from a software patch to a digital movie, among many other forms of content. The proxy cache device is a relatively high speed device than various possible devices making up one or more edge clusters. Thus, if the proxy has cached the requested content, it is capable of directly servicing the client content request at faster than providing the content from the edge cluster. Otherwise, the proxy cache may request the content from an edge cluster and store the content for quick retrieval in response to additional requests for the content. In one embodiment, the proxy cache may perform an analysis of the request or a series of requests to determine if the content is cached at the proxy cache device.

In addition, when the proxy does not have a cache copy of the requested content, the proxy cache may execute a hash operation and may be configured to slice the content request among the available edge clusters. In this manner, multiple copies of the content need not be stored in various edge clusters of the CDN. For instance, when a request for content A is hashed at a first edge proxy cache, the proxy cache requests content from one of a plurality of edge clusters based on the results of the hash operation. If the edge cluster does not have a copy of the content, the edge cluster retrieves a copy from a storage device, stores the copy, and delivers the requested content to the requesting proxy cache. Should a request for the content later be received at a second proxy cache, the second proxy cache will run the hash operation for the requested content, and will be directed to the edge cluster based on the results of the hash. Now, the edge cluster has a copy of the content and can immediately satisfy the request and return a copy to the second proxy cache. Similarly, the second proxy cache might request the content directly from the first proxy, provided it remains cached, rather than request it from the edge cluster. Such a scenario might be particularly utilized with relatively small and consistent content types, likely software patches that are regularly scheduled.

Figure 1:
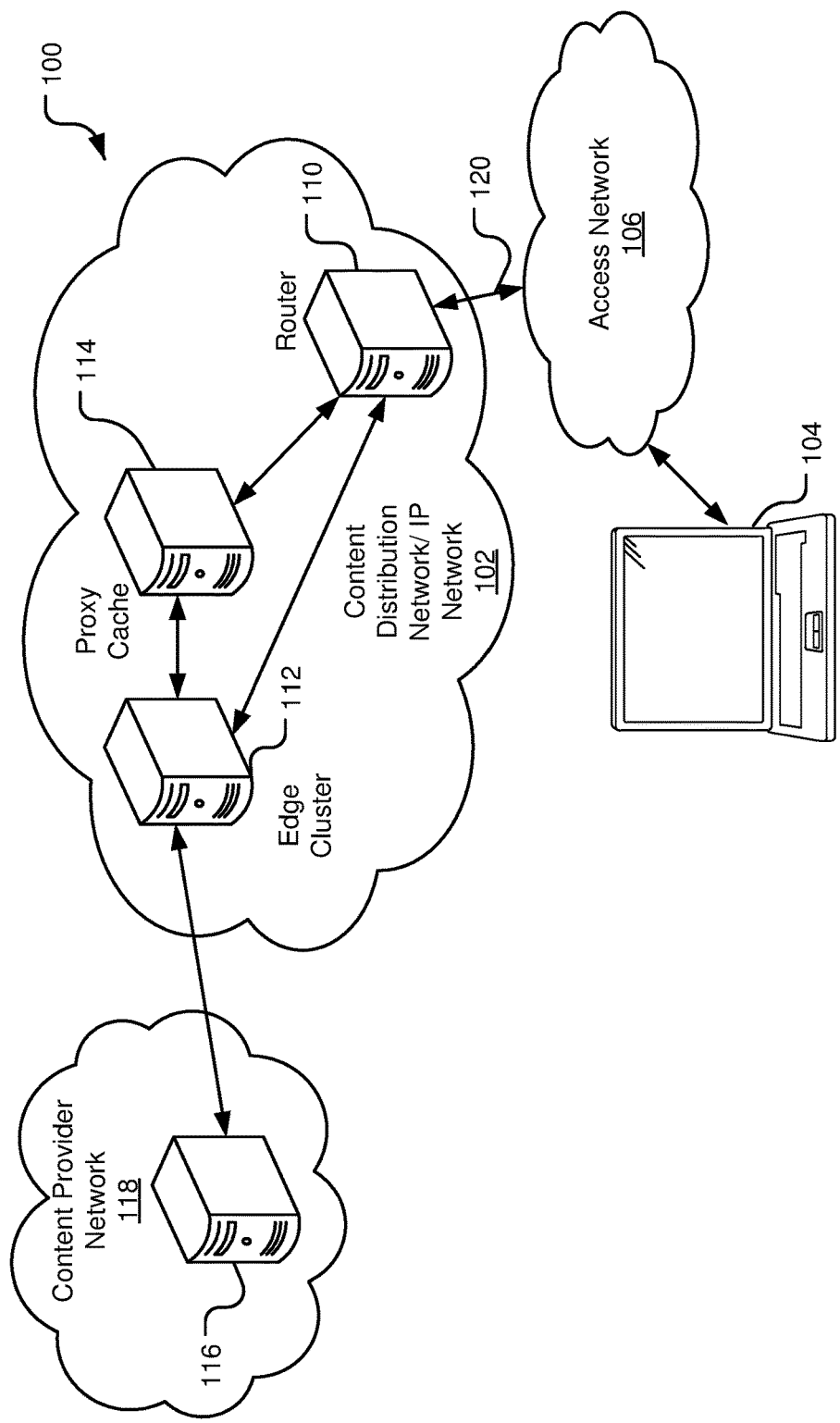
FIG. 1 is an example network environment for distributing content over a content delivery network (CDN).

FIG. 1 is an example network environment 100 for distributing content to one or more users based on a request for the content from a user's device. In one implementation, a CDN 102 is communicably coupled to one or more access networks 106. In general, the CDN 102 comprises one or more content servers (discussed in more detail below as edge clusters or edge servers), one or more proxy cache servers and routers all configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, the access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The request for content may be received at a router 110 of the CDN. In one particular embodiment, the request is transmitted through several components of the IP network before being received at the router. In addition, the CDN 102 may include a directory server configured to respond to the request by providing a network address (e.g., an IP address within an IP network) where the content associated with the selected link can be obtained. The directory server resolves the link name (e.g., URL or other identifier) to an associated network address from which the user device 104 can retrieve the content. In one particular embodiment, the directory server provides an IP address to one or more proxy servers or proxy caches of the network to respond to the request for content.

In one implementation, the CDN 102 includes one or more edge servers 112 (also sometimes referred to as an "edge cluster" when multiple edge servers are clustered together), which may cache content from another network to make it available in a more geographically or logically proximate location to the router 110 and/or user device 104. The edge clusters 112 may reduce network loads, free capacity, lower delivery costs, and/or reduce content download time. The edge clusters 112 are configured to provide requested content to a requestor, which may be the user device 104 or an intermediate device, for example, in the access network 106. In one implementation, the one or more of the edge clusters 112 provide the requested content that is locally stored in cache. In another implementation, the edge clusters 112 retrieve the requested content from another source, such as a media access server (MAS) (e.g., a content distribution server or a content origin server 116 of a content provider network 118). The content is then served to the user device 104 in response to the requests.

In general, the CDN 102 provides content to an end user 104 in the following manner. First, the CDN 102 receives a request for content from a user 104 through the access network 106. The CDN, utilizing a domain name system (DNS) that includes one or more directory servers that determine at least one appropriate edge clusters 112 or other upstream content networks 118 for delivering requested content to end-users. The DNS then returns an IP-address for the selected edge cluster 112 or content network 118 to the end user device 104 so that the end user device connects to the edge cluster 112 through the user's access network 106 to begin receiving the requested content. More particularly, a request for content from the edge cluster 112 identified by the IP-address provided to the user's device 104 is received at the router 110 of the IP network 102. In one embodiment, the router 110 transmits the request to the edge cluster 112 through the IP network 102 such that the edge cluster provides the content to the user's device 104.

In general, the IP-address provided by the DNS in response to a request for content connects the user's device to a server that hosts all or some content for a particular content host entity. In other words, the IP-address provided by the DNS may not directly connect the end user to the requested content file, but rather to a server that stores (such as an edge server of an edge cluster) or may access the particular content file (such as from a content provider network 118) for number of content files. The edge cluster 112 or content provider network 118 then provides the requested content file to the end user 104. Thus, as many edge clusters or edge servers may have access to a content provider network 118, the DNS may assign an IP-address for any of the edge servers or clusters with access to the content provider network to satisfy the content request. In one implementation, the assigning of an edge cluster 112 or content provider network 118 to provide the content to the end user 104 may be random among each edge cluster 112 of the local area that is capable of satisfying the request.

In one particular embodiment of the CDN 102, a proxy server or proxy cache 114 device may be logically located between the router 110 and the edge cluster 112. In general, the proxy cache 114 is a high performance cache that can slice content across several edge clusters 112 in a local area and/or cache popular content for availability to end user requests. Thus, in one implementation, the proxy cache 114 may act as a provider of content in response to a received request for popular content. The popularity of the content that triggers storage of the content at a proxy cache 114 may be based on any criteria, such as number of requests received, custom selection by the network 102, network configuration procedures, and the like. In another implementation, the proxy cache 114 may determine a particular edge cluster 112 from which content may be provided, thereby reducing the number of copies of the content stored by the CDN 102. For example, all proxy caches 114 in a particular area or segment of the network 102 (such as a metro network segment of the CDN 102) may fill requests for content from the same edge cluster 112 of the metro network, rather than having multiple copies of the same content stored on multiple edge clusters. The operation of the proxy cache 114 devices in the CDN 102 architecture is discussed in more detail below.

Although illustrated in FIG. 1 as including a router 110 in communication with the access network 106, it should be appreciated that any telecommunications device in the network 102 may receive the request from the user 104 and transmit the request to the proxy server 114 or edge cluster 112. In another embodiment, the user 104 may communicate with the network 102 directly without the use of an access network 106. In this embodiment, the user's request may be transmitted directly to the proxy server 114 or the edge cluster 112. Further and as explained in more detail below, the proxy server 114 may be instantiated in the access network 106 in communication with the user's device 104. Thus, in general, the proxy server 114 may be logically located anywhere along the communication chain described herein.

Figure 2:
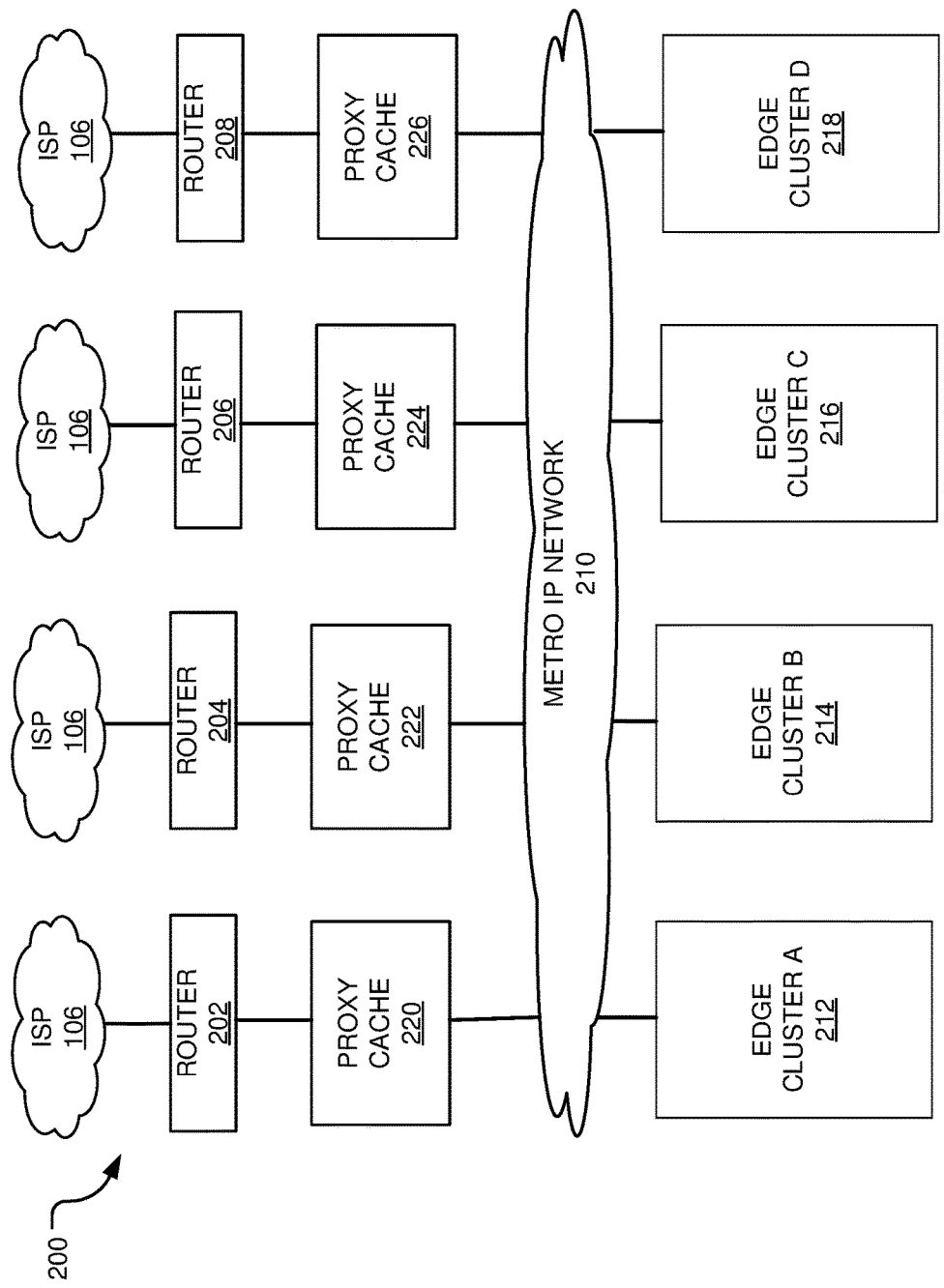
FIG. 2 is an example logical network environment for routing a request for content to a proxy server or proxy cache of the network.

FIG. 2 is an example logical network environment for routing a request for content to a proxy server or proxy cache of the network. In general, the components of the logical network environment 200 of FIG. 2 are similar to the components discussed above with relation to FIG. 1. In particular, the network environment 200 includes an access network or ISP 106 through which an end user device connects to a CDN. Although shown in FIG. 2 as including several instances of the ISP 106, it should be appreciated that the ISP may be the same logical network. The ISPs 106 connect to one or more routers 202-208 associated with a CDN network. Again, similar to the ISP 106, the routers 202-208 illustrated in FIG. 2 may be one router or several routers associated with the CDN 102. As discussed above, the routers 202-208 may receive requests for content available through the CDN, those requests identified by an IP-address for an edge cluster or content provider network through which the content is available. In one embodiment, the routers 202-208 may then route the requests through a local network (such as a metro IP network 210) to the edge cluster 212-218 associated with the IP address in the received request. The metro IP network 210 provides a local area network (LAN) connecting the one or more edge clusters 212-218 to the CDN 102. Further, although not shown in FIG. 2, the edge clusters 212-218 may be connected to or may otherwise access content from a MAS 116 of a content provider network 118.

In another embodiment, the DNS for the CDN may provide an IP-address associated with a proxy cache 220-226 device of the network in response for the content. For example, the DNS may be configured to provide an IP-address for a proxy cache 220-226 for every request for content received associated with the particular metro IP network 210. In another embodiment, some but not all requests for content received may be transmitted to one of the available proxy caches 220-226. Whether requests received for content is routed through a proxy cache 220-226 may be established through a network configuration by a network or CDN administrator.

To facilitate the routing of the requests through one or more proxy caches 220-226 of the network 200, the one or more proxy caches may be located logically between the edge clusters 212-218 and the user device through the ISP 106. In one embodiment, the proxy caches 202-208 are located logically between a router 202-208 of a telecommunications network and the metro IP network 210. The proxy caches 202-208 may provide a 20 Gigabyte connection between the proxy cache and the router 202-208 or routers for high-speed transmission of content. Further, as explained in more detail below, the proxy caches 220-226 are configured to slice content across several edge clusters 112 in an area and/or cache popular content for availability to end user requests.

As mentioned above, the proxy caches 220-226 may be in any location along the logical chain illustrated in FIG. 2. For example, the proxy caches 220-226 may be instantiated in the ISP 106 and receive the content request from the user's device 104 through a router 204 or other telecommunications device or directly from the user's device. In another embodiment, the proxy caches 220-226 may be instantiated within the metro IP network 210. In general, the proxy caches 220-226 may be logically located anywhere between the user's device and the edge clusters 212-218. The network configuration of FIG. 2 is but one example of a network utilizing the proxy caches 220-226.

Figure 3:
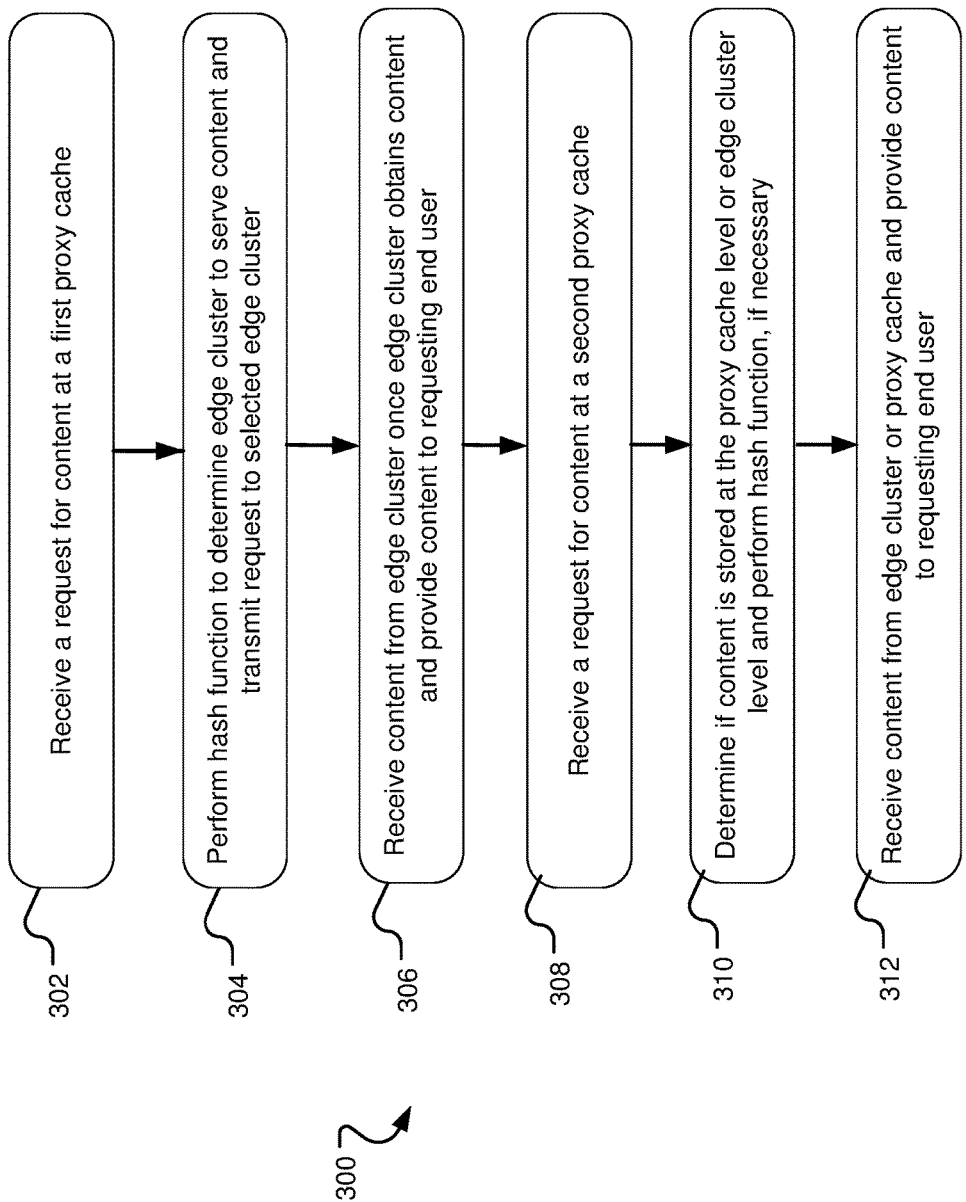
FIG. 3 is a flowchart illustrating a method for a CDN to utilize a slicing function to determine an edge server to provide content to a requesting user device.

With the logical network configuration or architecture of FIG. 2 in mind, FIG. 3 is a flowchart illustrating a method for a CDN to utilize a slicing function to determine an edge cluster to provide content to a requesting user device. In general, the operations of FIG. 3 are performed by one or more of the proxy caches 220-226 of the network through the execution of one or more instructions and/or through one or more hardware-based circuits of the proxy caches. As explained in more detail below, the method of FIG. 3 improves the performance of the CDN 102 by reducing the number of copies of content stored by the edge clusters 212-218 of the metro network 210 such that one peer cache may provide the content to each proxy cache 220-226 associated or otherwise in communication with the metro network.

Beginning in operation 302, a request for content available through the CDN 102 is received at a first proxy cache. In one example, the request may be received at the ISP 106 from an end user's device and is routed to router 202 based on an IP-address provided by the CDN DNS device. In response, the router 202 may then transmit the request to a proxy cache 220 of the network 200 associated with the provided IP-address for the proxy cache for further processing by the proxy cache.

In general, each edge cluster 212-218 in communication with the metro IP network 210 is configured to obtain the content and serve the requests for content received at the metro IP network 210. However, as requests for a particular content file are served by the multiple edge clusters 212-218, multiple copies of the content may then be stored by the edge clusters for future requests for the content. Thus, the efficiency and speed of the CDN 102 may be improved if a particular edge cluster 212-218 is selected to provide the requested content for each request received at the metro IP network 210. As such, in operation 304, the proxy cache 220 performs a hash value calculation to determine an edge cluster 212-218 through which the content may be provided in response to the request. In general, the proxy cache 220 may perform any calculation to determine the hash value. In one particular embodiment, the proxy cache 220 may utilize the received request to calculate the hash value in a repeatable manner such that the same hash value is returned for each request for a particular content file. For example, the proxy cache 220 may utilize the uniform resource locator (URL) address included in the request for content to calculate the hash value. Thus, as the IP address included in the request is related to the requested content file, the same hash value may be calculated for each request for the content file. Other aspects of the request may be utilized to calculate the hash value, such as an identifier of the client's device (IP address, network identification, etc.), other routing path information, a content file name identifiable by the content URL, a router identifier, the number of servers available to provide the content to the CDN, and the like. To ensure that multiple copies of the content file are not stored in the edge clusters 212-218, however, the hash value calculation may be repeatable such that each proxy cache 220-226 in the environment 200 that receives a request for that particular content file calculates the same or similar hash value in response to the request.

One or more of the proxy caches 220-226 may associate a hash value or range of hash values to the available edge clusters 212-218 associated with the metro IP network 210. For example, each available edge cluster 212-218 may be assigned a range of hash values by the proxy caches 220-226. Thus, upon the calculation of the hash value, the proxy cache 220 may determine which edge cluster 212-218 is associated with the hash value and select that edge cluster through which the requested content is retrieved. Further still, the hash value may be associated with a particular edge server or other upstream content providing device such that a particular storage device is identified through the hash value calculation. Also in operation 304, the proxy cache 220 routes the request for the content to the selected edge cluster 212-218 based on the hash value. Continuing the example above, the hash value calculated by the proxy cache 220 may select the edge cluster C 216 as the edge cluster of the metro IP network 210 from which the content is provided to requesting clients.

In operation 306, the proxy cache 220 receives the requested content from the edge cluster 216 once the edge cluster obtains the content. In one embodiment, the content is stored by the edge cluster 216 so that obtaining the content includes retrieving the content from storage. In another embodiment, the content may not be available at the edge cluster 216. In this embodiment, the edge cluster 216 may retrieve the requested content from another source, such as a media access server (MAS) (e.g., a content distribution server or a content origin server 116 of a content provider network 118). The content is then provided to the proxy cache 220 in response to the request. Further, the content may then be stored at the edge cluster 216 upon retrieval from the MAS for future use by the metro IP network 210 in response to requests for the content. The content may then be provided to the client's device in response to the received request by the proxy cache 220 back through the ISP 106. As explained below in relation to FIG. 4, the content may also be stored at the proxy cache 220 for quick retrieval in response to additional requests for the content.

Each of the proxy caches 220-226 in the network 200 may perform similar operations as described above when a request for the content is received. For example, in operation 308, a second proxy cache (such as proxy cache 226) may receive a request for the same content file described above through an associated router 208. This request may or may not be received from the same client device as described above. For example, popular content files may be requested by several client devices associated with the ISP 106. Upon receiving the request at the proxy cache 226 and similar to above, the proxy cache may perform the hash value calculation to determine which edge cluster 216 the content is available in operation 310. However, as also mentioned above and discussed in more detail below, a proxy cache associated with the metro IP network 210 may store one or more content files. Thus, prior to or in addition to calculating the hash value, the proxy cache 226 may determine if the requested content is available at another proxy cache 220-224 or available through one or more of the edge clusters 212-218. The retrieval of the content from another proxy cache 220-224 of the network 200 is discussed in more detail below with reference to FIG. 4.

If the content is not available from another proxy cache 220-224, the proxy cache 226 calculates the hash value as discussed above. In one embodiment, the hash value calculation is the same or similar for each proxy cache 220-226 in the network 200. Thus, the hash value calculation may provide an indication that the content is available through edge cluster C 216, similar to the hash value calculation discussed above. The request for the content may then be transmitted to the selected edge cluster 216 which may, in turn, provide the content to the proxy cache 226. In operation 312, the proxy cache 226 may receive the content from the edge cluster 216 (or another proxy cache if the content is stored at the proxy cache level) and provide the content to the requesting user device.

In the above example, proxy cache 220 and proxy cache 226 both request the content be provided to the end user from edge cluster 216. More particularly, by calculating the same hash value based on the request for content, both proxy caches 220,226 transmit the request for the content to the same edge cluster 216. In this manner, only one edge cluster 216 (and potentially only one edge server within the edge cluster) provides the content to the end user. Previously, the content may have been provided to the end user by any of the edge clusters 212-218 of the network 200. Further, because each edge cluster 212-218 is configured to store copies of the content obtained from a content provider, multiple copies of the content may be stored in the edge clusters of the network 200. Through the use of the hash value, however, only one copy of the content is stored in the edge clusters 212-218 as the same edge cluster 216 is selected by the proxy caches 220-226 to provide the content in response to a request. As such, the use of the proxy caches 220-226 performing the edge cluster selection from which the content is provided increases the overall efficiency of components in the metro network 200 by removing the potential for storage of multiple copies of a content file.

Figure 4:
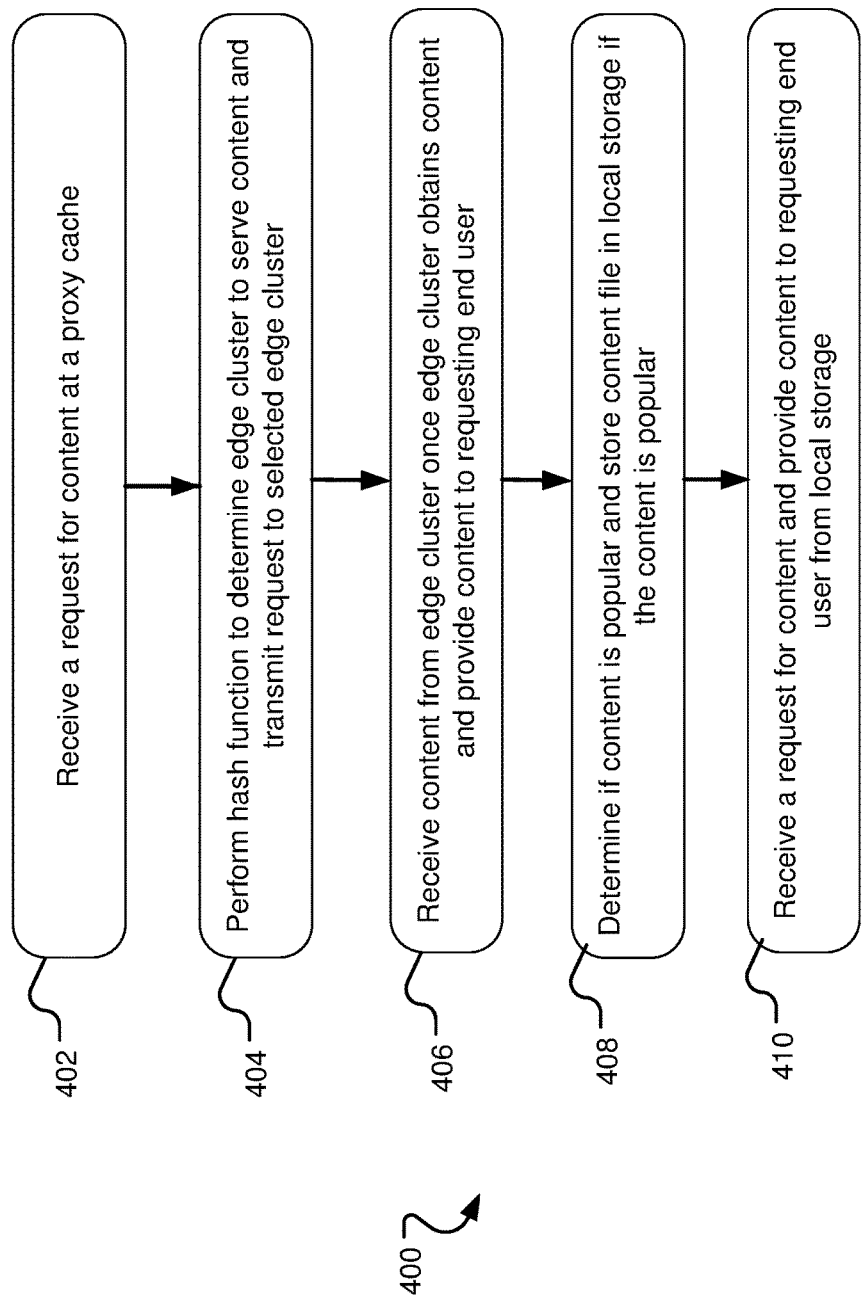
FIG. 4 is a flowchart illustrating a method for a CDN to utilize a proxy cache device to provide content to a requesting user device.

The overall efficiency and speed of the CDN may further be improved by storing one or more of the most popular content files (such as the most requested content files) in one or more of the proxy caches 220-226. FIG. 4 is a flowchart illustrating a method for a CDN to utilize a proxy cache device to provide content to a requesting user device. In general, the operations of FIG. 4 are performed by one or more of the proxy caches 220-226 of the network through the execution of one or more instructions and/or through one or more hardware-based circuits of the proxy caches. The operations of the method of FIG. 4 maintain one or more content files logically closer to the requesting user device to increase the speed at which the content file is provided to the requesting device.

In general, operations 402-406 are the same as operations discussed above with reference operations 302-306 of FIG. 3. Thus, a proxy cache (such as proxy cache 220) receives a request for content in operation 402. The proxy cache 220 then performs a hash value calculation to determine an edge cluster (such as edge cluster 216) through which the content is obtained and routes the request to the selected edge cluster in operation 404. In operation 406, the proxy cache 220 receives the content from the selected edge cluster and provides the content to the requesting end user.

In operation 408, the proxy cache 220 determines if the received content file is a popular file and stores the content file in a local storage if the content file is popular. In general, the proxy cache 220 may utilize any metric to determine if the received content file is popular. In one example, the proxy cache 220 may maintain a running total of each request received at the proxy cache. If the number of requests for the content file received at the proxy cache 220 equals or exceeds a threshold value of requests, the proxy cache may determine that the content file is a popular file and store the file in a local storage. In another example, the proxy cache 220 may be configured to locally store content files of a particular type, such as software patches or text-based content files. Thus, when the content file received from the edge cluster 216 is the type of content file indicated in the proxy cache configuration, the content file may be stored in the local storage. In yet another example, the CDN 200 may provide a list of content files that the CDN has deemed popular to each of the proxy caches 220-226. In this example, if the proxy cache 220 receives a content file that matches the list of popular content files, the content file is stored in a local storage by the proxy cache.

Regardless of the metric used to determine the popularity of the received content file, the content file may be stored by the proxy cache 220 and made available from the proxy cache for future requests received through the network 200. Thus, in operation 410, the proxy cache 220 may receive an additional request for the content file from an end user of the network 200. The proxy cache 220, in response, may identify the requested content file as a content file that is stored locally and provide the content file to the end user from the local storage. As should be appreciated, by storing popular content files in the proxy cache 220-226, the content file may be provided to the end user faster than if the content file is requested from an edge cluster 212-218 or from a content provider network. Thus, by storing popular content files at the proxy cache layer, the network 200 provides the content file to the end user faster than previous network configurations that provide the content from the edge cluster layer.

In addition, a content file stored at a proxy cache (such as proxy cache 220) may be made available to other proxy caches 222-226 in the network 200. As discussed above with reference to the method of FIG. 3, a proxy cache may be configured to determine if a requested content file is stored at the proxy cache level 220-226 of the network 200 or at an edge cluster level 212-218 (or even further upstream to a content provider network). If the content is stored at a first proxy cache 220 of the network 200, a second proxy cache (such as proxy cache 226) that receives a request for the content file may transmit the request to the first proxy cache 220 that has stored the content file locally. In one embodiment, the first proxy cache 220 that has the content file stored locally may then provide the content file to the end user. In another embodiment, the content file may be provided to the second proxy cache 226 by the first proxy cache 220 in response to receiving the transmitted request. In this embodiment, the content file may be then be provided to the end user by the second proxy cache 226 and may be locally stored by the second proxy cache, if the content file matches a popularity metric associated with the second proxy cache. In this manner, a content file stored at the proxy cache level 220-226 of the network 200 may be provided to the end user.

In the above scenario, the second proxy cache 226 may be made aware of the content files stored locally by the other proxy caches 220-224 in the network 200. In one embodiment, a flag or other indicator of a stored file, including an identification of the stored file and an identification of the storing proxy cache, may be transmitted to and stored by the proxy caches 220-226 in the network 200 when the content file is stored locally by a proxy cache. A proxy cache receiving a request for a content file may then check the list of stored content files to determine where the content file may be stored and made available. Regardless of how the proxy cache device determines that the content file is available from the proxy cache level 220-226 of the network 200, the content file may be obtained and/or provided to the end user from the proxy cache level, thereby increasing the speed at which the content is provided to the end user.

Figure 5:
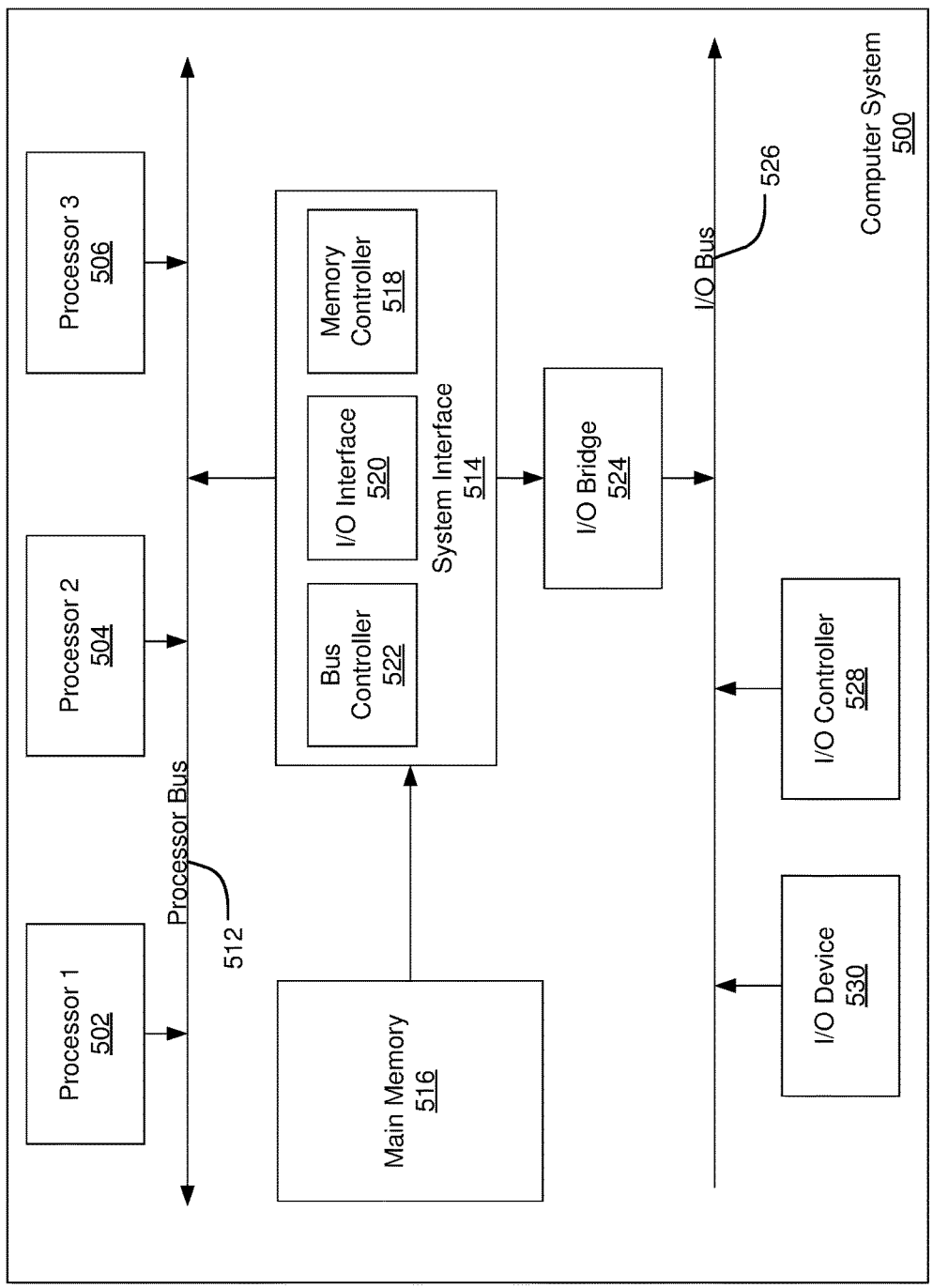
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be used to implement the router or proxy caches discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A content delivery network comprising:
 a proxy cache device configured to receive a request for a resource from a user device, wherein the resource request is transmitted from the user device to the proxy cache device via a first network; and
 a plurality of edge servers in communication with the proxy cache device via a second network, each of the plurality of edge servers configured to retrieve a copy of the resource in response to receiving the resource request;
 wherein the proxy cache device is further configured to:
  calculate a hash value based at least on the resource request;
  select an edge server from the plurality of edge servers based at least on the calculated hash value;
  transmit the resource request to the selected edge server; and
  in response, receive a copy of the requested resource from the selected edge server via the second network.

2. The content delivery network as recited in claim 1 wherein the proxy cache device is further configured to provide the copy of the requested resource to the user device via the first network.

3. The content delivery network as recited in claim 1 wherein the resource request comprises a uniform resource locator associated and the hash value is calculated based at least on the uniform resource locator.

4. The content delivery network as recited in claim 3 wherein the calculation of the hash value is repeatable for an additional request for the resource received at the proxy cache device.

5. A method comprising:
 receiving a request for a resource at a proxy cache device, wherein the resource request is transmitted from a user device to the proxy cache device via a first network;
 calculating a hash value based at least on the resource request;
 selecting an edge server from a plurality of edge servers based at least on the calculated hash value, the plurality of edge servers in communication with the proxy cache device via a second network and configured to retrieve a copy of the requested resource in response to receiving the resource request;

transmitting the resource request to the selected edge server; and in response, receiving a copy of the requested resource from the selected edge server via the second network.

6. The method as recited in claim 5, further comprising:

providing the copy of the requested resource to the user device via the first network.

7. The method as recited in claim 5 wherein the resource request comprises a uniform resource locator and the hash value is calculated based at least on the uniform resource locator.

* * * * *